(12) United States Patent
Ebersole, Jr.

(10) Patent No.: US 7,034,779 B2
(45) Date of Patent: Apr. 25, 2006

(54) ADVANCED RUGGEDIZED AUGMENTED REALITY INSTRUMENTED SELF CONTAINED BREATHING APPARATUS

(75) Inventor: John Franklin Ebersole, Jr., Bedford, NH (US)

(73) Assignee: Information Decision Technologeis, LLC, Bedford, NH (US)

( * ) Notice: Subject to any disclaimer, the term of this patent is extended or adjusted under 35 U.S.C. 154(b) by 0 days.

(21) Appl. No.: 10/739,575

(22) Filed: Dec. 17, 2003

(65) Prior Publication Data

US 2004/0130504 A1 Jul. 8, 2004

Related U.S. Application Data

(63) Continuation-in-part of application No. 10/213,392, filed on Aug. 6, 2002.

(51) Int. Cl.
*G09G 5/00* (2006.01)
(52) U.S. Cl. .............................. 345/8; 345/7
(58) Field of Classification Search .................... 345/7, 345/8, 633; 128/205.27, 205.28, 205.29, 128/201.19, 201.29, 202.13; 356/620; 340/626, 340/571; 455/351, 661, 662; 381/367, 381; 434/226; 600/595
See application file for complete search history.

(56) References Cited

U.S. PATENT DOCUMENTS

| | | | | |
|---|---|---|---|---|
| 5,392,769 A | * | 2/1995 | Siegel | 128/201.28 |
| 5,717,414 A | * | 2/1998 | Bergsneider et al. | 345/8 |
| 5,973,602 A | * | 10/1999 | Cole et al. | 340/584 |
| 6,606,993 B1 | * | 8/2003 | Wiesmann et al. | 128/204.23 |
| 6,757,068 B1 | * | 6/2004 | Foxlin | 356/620 |
| 2002/0158816 A1 | * | 10/2002 | Snider | 345/8 |
| 2002/0196202 A1 | * | 12/2002 | Bastian et al. | 345/8 |
| 2003/0154983 A1 | * | 8/2003 | Marx | 128/205.27 |

* cited by examiner

*Primary Examiner*—Vijay Shankar
*Assistant Examiner*—Nitin Patel
(74) *Attorney, Agent, or Firm*—Brian M. Dingman, Esq.; Mirick, O'Connell, DeMallie & Lougee (57) ABSTRACT

An augmented reality instrumented SCBA with electronic equipment with positional tracking equipment, airflow of both the user's breathing and electronic cooling, and a head pad that allows the unit to rest more comfortably on a user's head.

18 Claims, 7 Drawing Sheets

ADVANCED RUGGEDIZED AUGMENTED REALITY INSTRUMENTED SELF CONTAINED BREATHING APPARATUS

CROSS REFERENCE TO RELATED APPLICATIONS

This application is a Continuation in Part of "A Ruggedized Instrumented Firefighter's Self Contained Breathing Apparatus" Ser. No. 10/213,392 filed Aug. 6, 2002.

FIELD OF THE INVENTION

This invention relates to protection of equipment used for purposes of immersing a user in an augmented reality (AR) or virtual reality (VR) environment.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Information establishing the real-time position and orientation of a user's head is useful for both Augmented Reality (AR) and Virtual Reality (VR). AR involves the ability to acquire images of the user's environment, augment those images with computer-generated elements, and display the composite images to the user, from the user's perspective. This information can be gathered by instrumenting a Self Contained Breathing Apparatus (SCBA). This instrumentation is sensitive, however, and will not function if it is subjected to severe shock or other undesirable environmental hazards, such as penetration by water. The undesirable presence of shock or pollutants can result in negative effects ranging from bad calibration of equipment all the way to equipment failure or equipment destruction. Therefore, it is very desirable to protect SCBA equipment being used for AR and VR.

SUMMARY OF THE INVENTION

A Self Contained Breathing Apparatus (SCBA) is instrumented with a head-mounted display (HMD), camera, and tracking equipment, and has a protective shell enclosing all of this equipment. Different implementations of tracking equipment can make an improvement in tracking quality. The wearer's breathing comfort can be improved by allowing better airflow, and possibly even allowing the use of a firefighter's standard compressed air regulator. Also, the instrumentation and protective shell adds a fair amount of weight, and adding a pad that rests on the user's head can help to support some of that weight, providing a better overall user experience. The inventive SCBA can be used by firefighters, emergency first responders, miners, industrial workers and others who use SCBA equipment and need to be trained while wearing such equipment.

DETAILED DESCRIPTION OF THE PREFERRED EMBODIMENTS OF THE INVENTION

Equipment to be Protected

In the preferred embodiment of the invention, the SCBA to be used is a Scott® Air-Pak® SCBA. The instrumentation for the SCBA consists of (1) a head mounted display (HMD) used to show an image to the user; (2) a camera used to acquire the image the user is looking at; (3) a system used to measure the SCBA orientation and the SCBA position; and (4) a prism used to shift the image in front of the user's eyes so that the image is in front of the camera. All of this equipment, except for the prism, has electrical connections that carry signals through a tether to a computer, which receives and processes these signals, then sends an augmented image and sound back to the user.

Layout of Components

Figure 1:
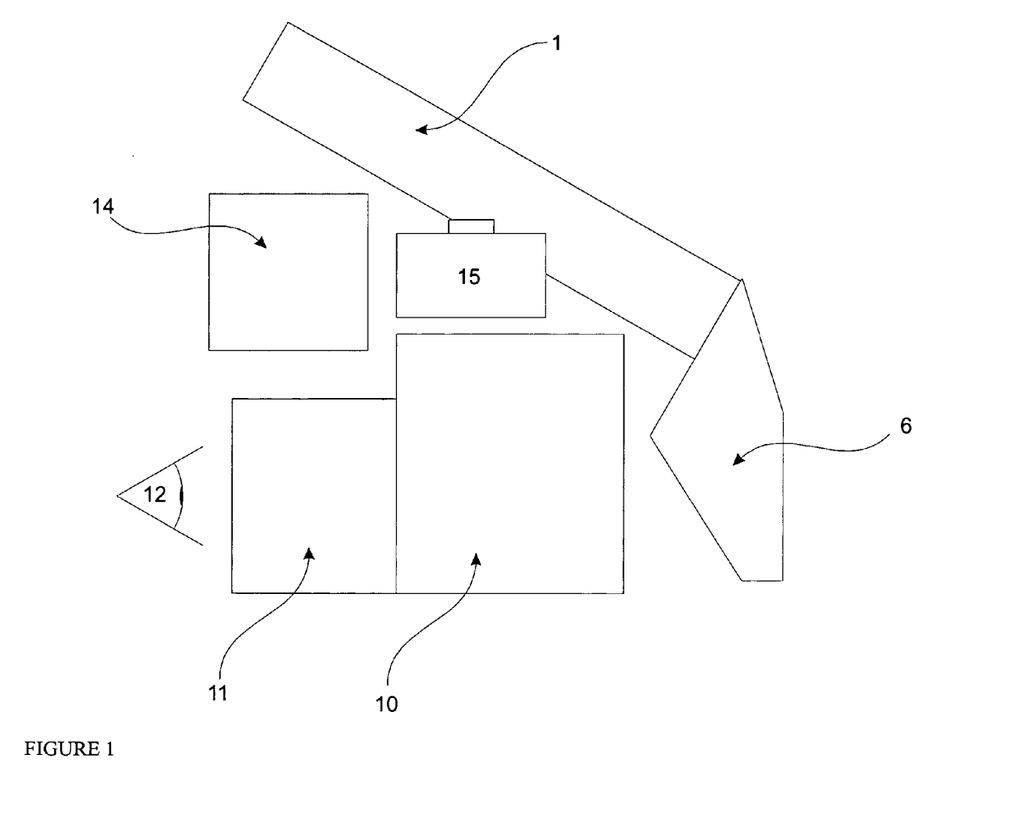
FIG. 1 schematically depicts the basic components of the preferred embodiment of the invention and one possible arrangement of them.

In FIG. 1, the eye 12 of the person wearing the SCBA (not shown) looks through the optics 11 to see the image formed on the display element inside the electronics portion 10 of the HMD. Separately, the image of the outside world is captured by camera 1, which looks through a prism 6 that has two reflective surfaces to bend the path of light to the camera 1. The position and orientation tracking system components, whether using an optical, acoustic, or other type of system, are shown here as 14 and 15, though the specific components may differ depending on the tracking system.

Equipment Mounting and Connections

The HMD is mounted directly to the SCBA. SCBA position and orientation tracking system components are attached rigidly to the camera/prism assembly (or mirrors if those are used), or to the SCBA/shell assembly, locking their positions together. By locking the position tracking equipment to the camera/prism assembly, one can ensure that the computer-generated imagery will correspond to the camera's position. A hard plastic electronics enclosure or shell 40 (FIG. 2) attaches to the SCBA 31 preferably with bolts, providing a means for hiding from view and protecting from the elements all electronic equipment, except for the microphones 34&35, which must be exposed to the air to allow the separate speakers (not shown) to transmit ultrasonic chirps to the microphones. The plastic shell 40 that surrounds all of the equipment should be made of a tough material, such as nylon, that can withstand the shock of being dropped, yet is slightly bendable, allowing for a little bit of inherent shock-mounting for the equipment. If this is not sufficient, then the HMD 10, prism 6, camera 1, and/or tracking equipment can be mounted to the SCBA 31 and plastic shell 40 with rubber mounting points (not shown). In this case the HMD, prism, camera, and/or tracking equipment can all be mounted together with a very rigid structure, for example a metallic frame (not shown). That rigid structure could then be mounted separately to the plastic shell, preferably with shock-absorbing mounts.

Figure 2:
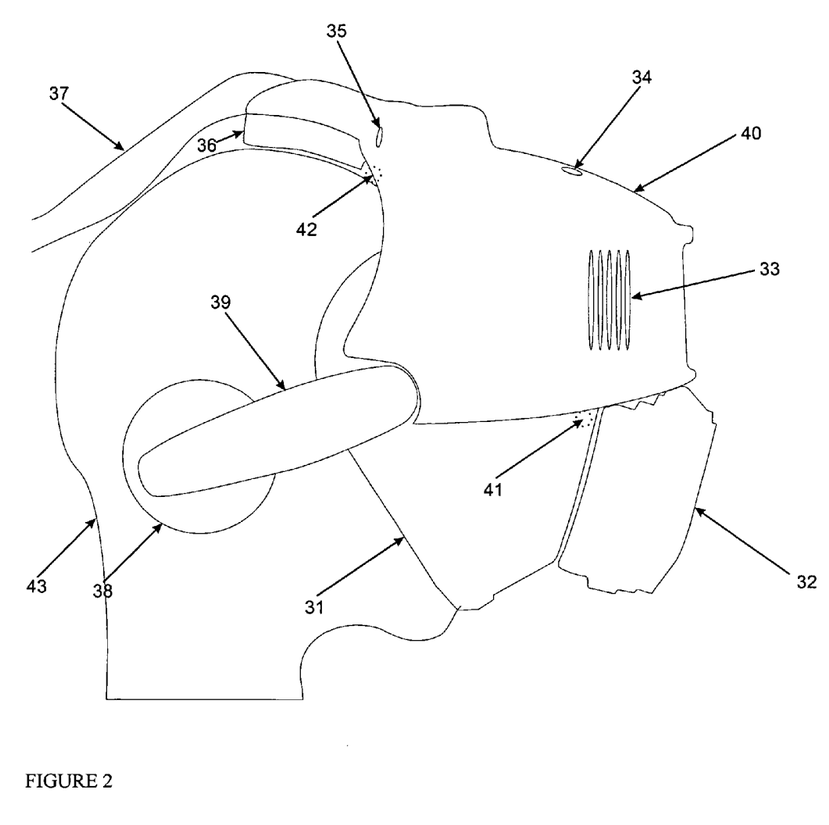
FIG. 2 depicts the locations of the components of the invention in one reduction to practice of the invention.

Overview of FIG. 2

In FIG. 2, a side view (the user 43 wearing the unit would face to the right) of the fully assembled system can be seen from the outside. The SCBA (self-contained breathing apparatus) 31 from Scott® Air-Pak® is modified to mount the augmented reality equipment to it. The SCBA regulator 32, is unmodified from Scott® Air-Pak®, and may be used either with or without compressed air depending on implementation in the system. Louvered vent holes 33 in the shell 40 may be used if necessary for proper airflow and cooling of internal components. Shell 40 may be made of several individual pieces, but as a whole serves to protect the internal components. Microphone pairs 34 and 35 (four total) are part of the tracking system that tell computer equipment where the user is looking, a critical ability of the augmented reality system. Head pad 36 rests on the user's head 43, and relieves much of the pressure that the user's face would otherwise be feeling. Cable bundle 37 exits the shell with a protective and flexible covering around the individual cables. Headphone 38 is mounted on headphone arm 39, which in turn is mounted to the SCBA 31.

Figure 3:
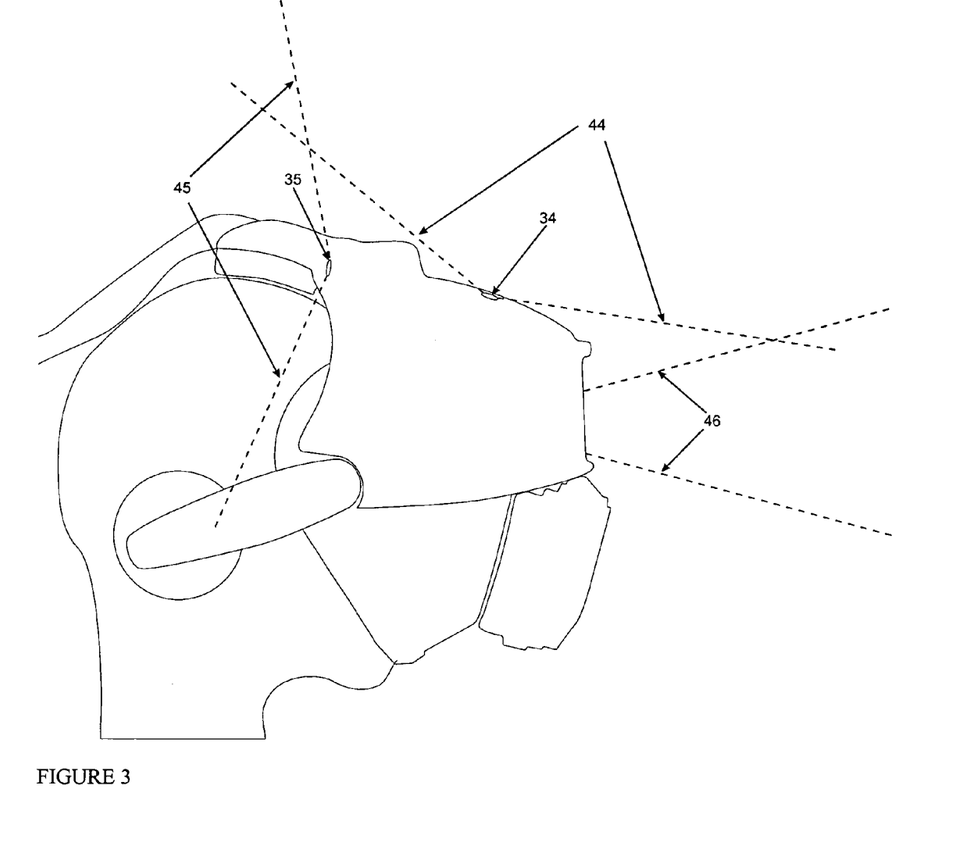
FIG. 3 depicts overlapping acoustic fields of view of acoustic microphones to achieve effective tracking in the embodiment of FIG. 2.

Overview of FIG. 3

Microphone pair 34 and pair 35 (such as that available in the InterSense IS-900 system available from InterSense, Burlington, Mass.) each have a conical acoustic field of view (FOV) 44 and 45, respectively, which allow each pair to "see" the acoustic transmitters elsewhere in the user's space in order to achieve tracking. The preferred embodiment is to have the FOVs overlap so that the system can always track the user's head position. As the user tilts his/her head forward, FOV 44 may not be able to "see" acoustic transmitters located, typically, in the ceiling above the user. At this point, the use of FOV 45 allows the overall system to still "see" the acoustic transmitters. An alternative embodiment is to substitute optical sensors for the acoustic microphones 34 and 35.

Figure 4:
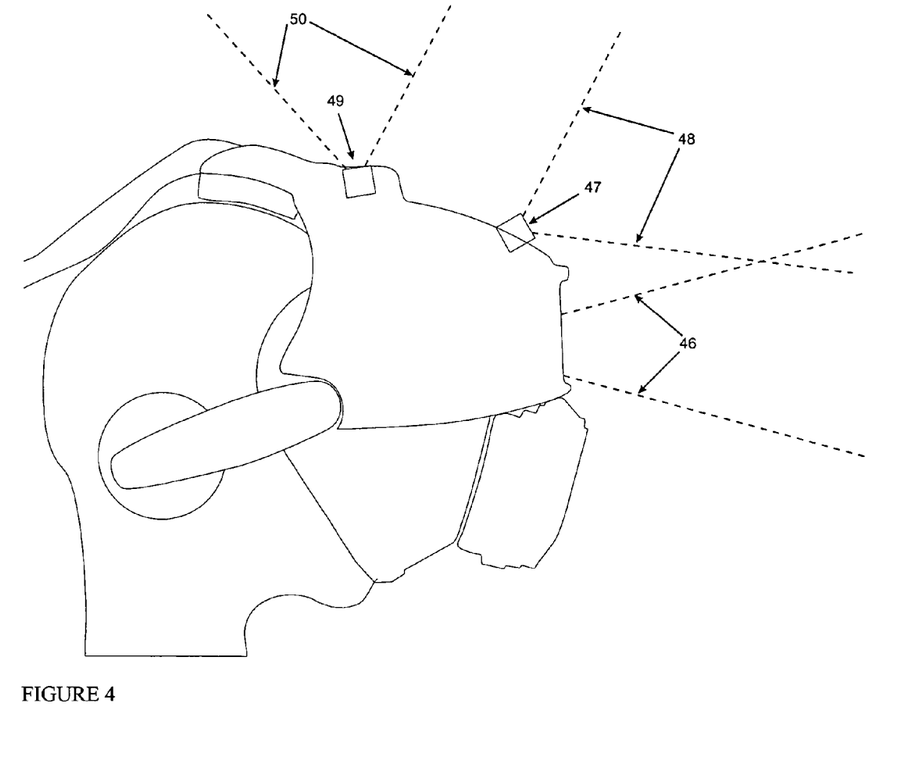
FIG. 4 depicts the layout of optical fields of view of optical sensors to achieve effective tracking in an alternative reduction to practice.

Overview of FIG. 4

FIG. 4 shows an embodiment with optical sensor 49 with FOV 50 and optical sensor 47 with FOV 48. The FOV 48 is shown overlapping (in this instance) the user's FOV 46.

Improvements in Tracking Due to Multiple Microphone Placement

Figure 7:
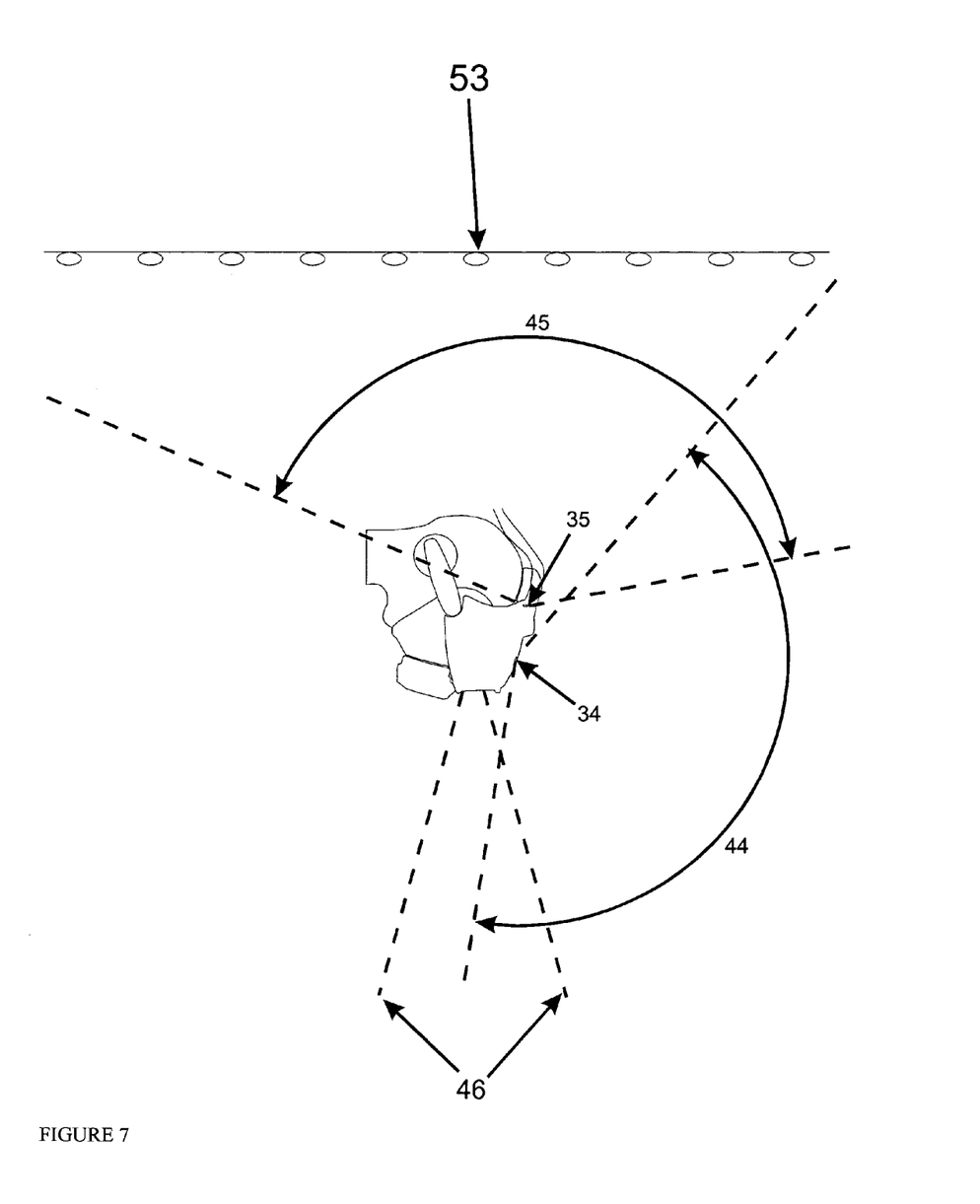
FIG. 7 shows the same user from FIG. 6, but with user instead looking down on the floor, thus using the rear-facing microphones

In the parent application (incorporated herein by reference), only one pair of tracking speakers were used, and they were located in between microphone pairs 34 and 35, pointing straight up towards the ceiling-mounted tracking system components, which were microphones. In certain circumstances, especially when the user was at the end of the tracking area and looking down at the floor as in FIG. 7, the single pair of speakers could no longer "see" the tracking components 53 in the ceiling, and the system would lose tracking of the user. To combat this, the present invention uses two pairs of microphones 34 and 35 at two different locations, with one pair 34 on the top pointing up, and one pair 35 on the back pointing back. This new configuration allows the user to go to the very end of the tracking area and look down and still be tracked. Note that in FIG. 3, the field of view (FOV) 44 for microphone pair 34 and FOV 45 for microphone pair 35 in a preferred embodiment overlap each to ensure improved tracking. Note that the microphones do not theoretically need to be in pairs, but at least two are needed for tracking, and three or more are needed for improved tracking when near the edge of the tracking range, and four or more are needed to track really well.

Improvements in Tracking Due to Shielding

Some of the tracking electronics suffer from interference from other equipment inside the unit, so shielding was added to surround the circuit board and power supplies, and then the shielding was grounded, which solved the problem.

Improvements in Tracking Due to Use of Optical Tracking Systems

In another embodiment, the microphones are replaced by optical sensors, such as that made by InterSense, to perform the tracking achieved by the ultrasonic microphones/receiver. The optical sensors detect, and process by an onboard or offboard computer, images of objects in the field of view of the sensor. In one embodiment, these objects may be prescribed optical patterns affixed in various locations in the space in which the user is located. In another embodiment, the objects may be indigenous to the location, i.e., optical processing is performed on images of objects already located in the space.

Figure 5:
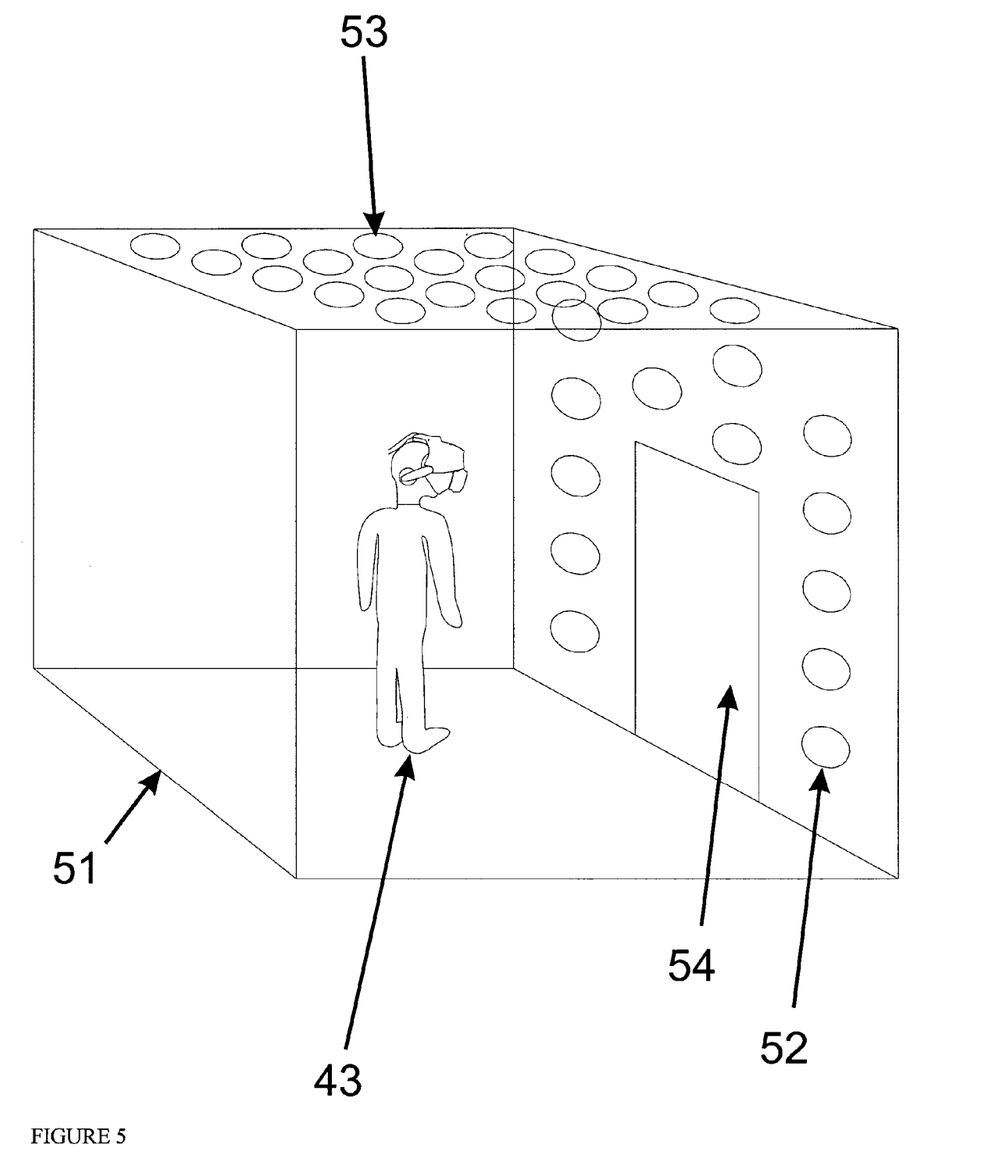
FIG. 5 shows the tracking space that a user of the invention may be in relation to the tracking devices placed in the room.
Figure 6:
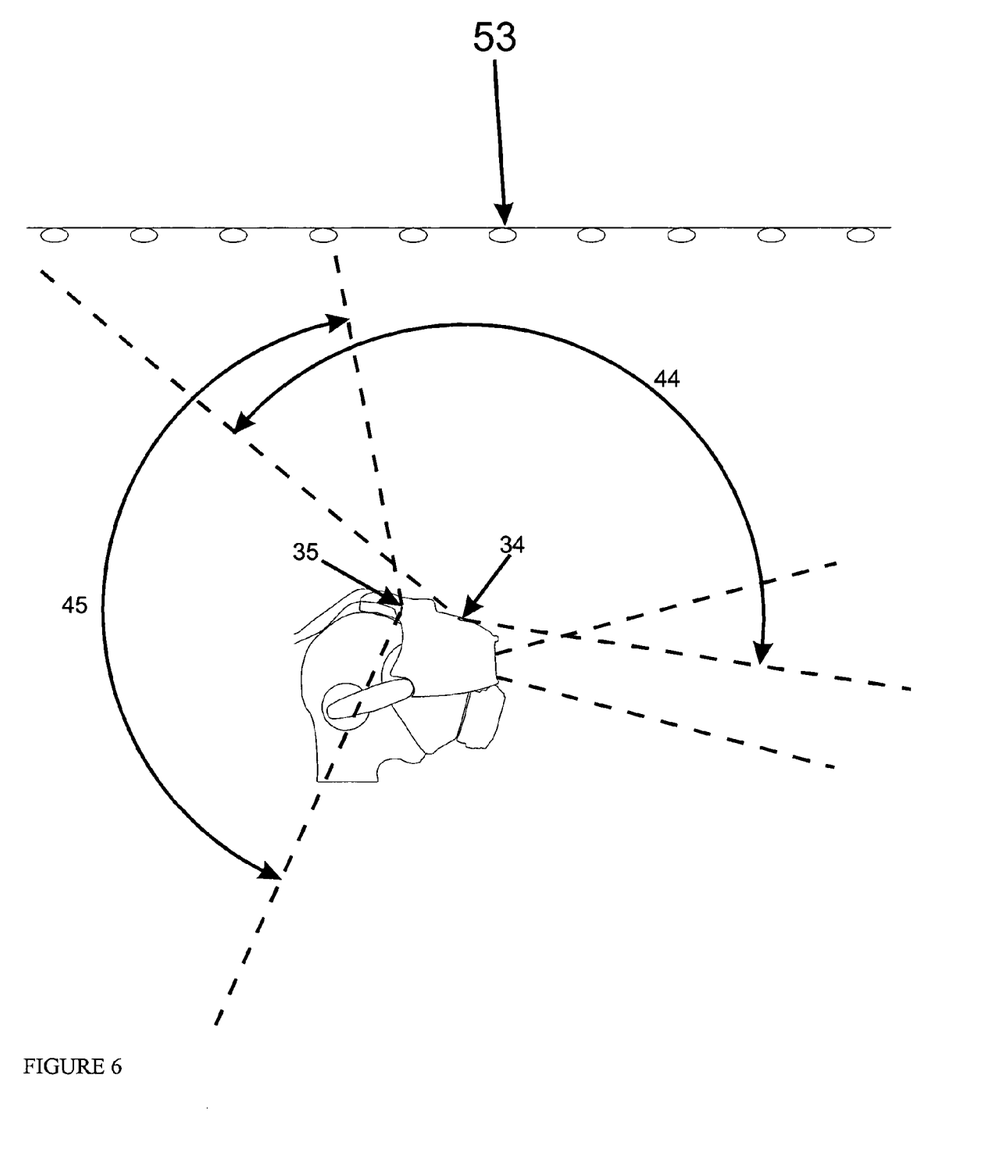
FIG. 6 shows the operation of the tracking system in regards to tracking objects in the ceiling when the user is upright.

When an optical tracking system is used, the optical sensor (or sensors) should be placed on the unit to maximize visibility of optical targets in the space. In a situation where the space has a tall ceiling, a single sensor 49, FIG. 4, may be sufficient since its FOV 50 is able to see the ceiling (and any targets 53, FIG. 5, on the ceiling) when the user is looking straight and level. With a low ceiling, a sensor 47 may be more appropriate since its FOV 48 can see optional targets 52, FIG. 5, on the walls. Additionally, since FOV 48 overlaps the majority of the user's FOV 46, the tracker will help to optimize the tracking of targets 52, FIG. 5, in the locations that the user is looking, such as aiding accurate tracking next to a door 54, FIG. 5. In the preferred embodiment, both sensors 47 and 49 are implemented to maximize tracking FOV coverage, with the two FOVs 48 and 50 laid out so as to create neither a significant gap nor a significant overlap (this is shown in FIG. 4 as the left ray of FOV 48 running parallel to the right ray of FOV 50). Also in the preferred embodiment, there would be tracking targets 52 and 53 available to maximize accuracy of tracking.

Improvements in Breathing Comfort for the User Due to Use of a Passive Regulator Typically, when users are wearing an SCBA with no regulator attached, a fair amount of their exhaled air goes up into the mask, causing a "fogging" problem and obscuring the view. A Scott® Air-Pak® EZ-Flow regulator 32, FIG. 2, with no compressed air attached, can be effectively used as a one-way valve. If the holes that lead up to the rest of mask at location 41 are plugged up, then exhaled air will go through only the regulator, and not back up into the rest of the mask. In this configuration, when the user breaths out, air exits through the regulator. When the user breathes in, fresh air is drawn in through gaps at location 42, between the shell 40 and SCBA 31. This air drawn in flows over the components inside the shell 40 that are prone to becoming "fogged up" thus minimizing the problem. Added benefits to this include: (1) cooling the user since the fresh air blows across the user's face 43, (2) the original regulator can be used, thus retaining realistic equipment, (3) no compressed air is required, thus making use and maintenance of the equipment easier, and (4) if the SCBA produces a good seal to the user's face, then virtually all of the exhaled air with exit the mask directly.

Improvements in Breathing Comfort for the User Due to Use of Compressed Air with a Regulator When an SCBA is used normally by a user (without augmented reality instrumentation), it is used with compressed air driving the regulator. Under that circumstance, the SCBA is under a very minor positive pressure, and any leaks in the seal of the mask to the user's face will result in air leaking out. In one embodiment of the invention, the air gaps are very large, and a large amount of air would leak by under normal circumstances. If the regulator is used with the "purge" setting, the amount of constantly leaking flow can be controlled with the "purge" knob, and only a small amount of airflow needs to be used to obtain a dramatically improved cooling effect for both the user and electronics. This implementation may be beneficial as it allows the use of compressed air, and can provide adequate cooling for the equipment and user. In this case, the holes that lead up to the rest of mask at location 41 should not be plugged up, since some of the dry, cool air should go up the mask to "defog" the electronics.

Alternatively, the invention can be made to be air tight, and compressed air can be used in the normal fashion. In this implementation, it would be wise to add a one-way valve in the shell 40 at location 42. This additional one-way valve would allow the user to still breath properly with this unit and retain equipment cooling, in the situation where the compressed air supply has run out or is not attached.

Improvements in Equipment Cooling Due to Use of Louvered Air Vents

Louvered side vents 33 may be used if specific equipment cooling is needed. Some equipment may need fans, blowing air either in or out of the shell 40. By making the holes louvered (in the preferred embodiment) instead of flat holes, (1) it will be more difficult for users to accidentally cover the holes with their hands, (2) foreign objects will be less likely to enter the unit, and (3) the appearance of the holes will be more appealing.

Improvements in User Comfort Due to Use of a Foam Head Pad

The foam head pad 36 rests on the head 43 of the wearer, just above the forehead, and is attached to the shell 40. Normally, the SCBA 31 is fully supported by the rubber gasket of the SCBA resting on the user's face. With the additional weight of the augmented reality instrumentation, it can become uncomfortable, and the head pad 36 relieves a great deal of the perceived weight.

Improvements in Durability Due to Use of Advanced Cable Shielding

The cable bundle 37 leaving would be just raw cable with standard shielding from the manufacturer. To improve utility and life span of the cable bundle as a whole, a slippery, yet very durable and flexible outside wrap around the bundle should be used. The parent application discloses the use of a polyester expandable sleeving. The preferred embodiment herein is to use Kevlar® or any other kind of material with improved performance.

What is claimed is:

1. A ruggedized Self Contained Breathing Apparatus (SCBA) instrumented with electronic and passive equipment so that the instrumented SCBA can be used in augmented reality-based training in which the location and orientation of the user's head is tracked by a tracking system that has passive or active tracking system components located in the training environment, and active tracking system components carried on the person of the user, comprising:

an instrumented SCBA mask adapted to be worn by a user to cover at least the user's mouth and nose, the instrumented SCBA mask comprising a breathing portion adapted to cover at least the user's mouth and nose;

a head mounted display for displaying to the user an augmented reality or virtual reality image;

an image shifter;

a covering device that covers at least part of the breathing portion, to protect at least some of the breathing portion and at least some of the electronic and passive equipment from shock and environmental hazards; and at least three detecting elements of the head tracking system, the detecting elements directly or indirectly coupled to the SCBA, so that both the location and orientation of the user's head can be determined by the tracking system.

2. The ruggedized SCBA of claim 1 in which the detecting elements comprise microphones that are mounted so that they are exposed to the outside of the covering device.

3. The ruggedized SCBA of claim 2 in which the field of view of at least one microphone overlaps the user's field of view.

4. The ruggedized SCBA of claim 2 in which the detecting elements comprise four microphones organized into two pairs, with one of each pair located on one side of the user's head, and the other of each pair located on the other side of the user's head.

5. The ruggedized SCBA of claim 4 in which a first pair of the microphones is located toward the front of the SCBA and a second pair of the microphones is located toward the rear of the SCBA.

6. The ruggedized SCBA of claim 5 in which the microphones of the first pair are each adapted to receive sound waves emanating generally from in front of and above the user's head, and the microphones of the second pair are each adapted to receive sound waves emanating generally from in back of the user's head.

7. The ruggedized SCBA of claim 1 in which the instrumentation is shielded to improve tracking quality.

8. The ruggedized SCBA of claim 1 in which the breathing portion comprises a compressed air breathing regulator that is used without compressed air in order to act as a one-way valve that passes air exhaled by the user from the SCBA mask.

9. The ruggedized SCBA of claim 1 in which the breathing portion comprises a compressed air breathing regulator that is used with compressed air, and wherein the SCBA mask is not air-tight, thus allowing the compressed air and exhaled air to exit the SCBA mask through gaps in the SCBA.

10. The ruggedized SCBA of claim 1 in which the breathing portion comprises a compressed air breathing regulator that is used with compressed air, and wherein the SCBA mask is air-tight, thus allowing normal use of the SCBA breathing systems, and allowing compressed air and exhaled air to exit the SCBA through the standard exit in the regulator.

11. The ruggedized SCBA of claim 10 further comprising an additional one-way valve to allow air into the SCBA mask in the case that the user inhales, and no compressed air is available.

12. The ruggedized SCBA of claim 1 further comprising louvered air vents in the SCBA located such that air entering through the vents flows directly onto at least some of the electronic equipment.

13. The ruggedized SCBA of claim 1 further comprising a resilient pad attached to the covering device in such a manner as to support the SCBA directly on the user's head.

14. The ruggedized SCBA of claim 1 further comprising a cable bundle wrapped with a high strength polymer cable wrap to add durability.

15. The ruggedized SCBA of claim 1 in which the detecting elements comprise optical sensors.

16. The ruggedized SCBA of claim 15 in which the detecting elements comprise four optical sensors organized into two pairs, with one of each pair located on one side of the user's head, and the other of each pair located on the other side of the user's head.

17. The ruggedized SCBA of claim 16 in which a first pair of the optical sensors is located toward the front of the SCBA and a second pair of the optical sensors is located toward the rear of the SCBA.

18. The ruggedized SCBA of claim 17 in which the optical sensors of the first pair are each adapted to receive signals emanating generally from in front of and above the user's head, and the optical sensors of the second pair are each adapted to receive signals emanating generally from in back of the user's head.

* * * * *